No. 828,286. PATENTED AUG. 7, 1906.
W. E. HENDERSON.
PIN.
APPLICATION FILED AUG. 16, 1905.
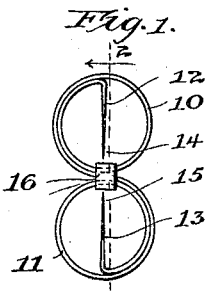
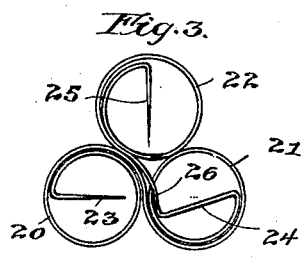
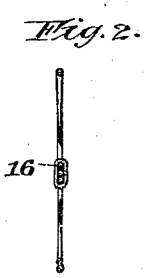
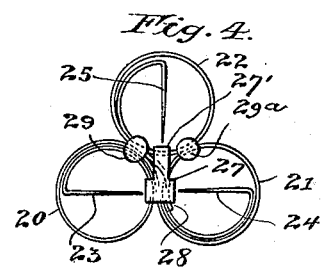
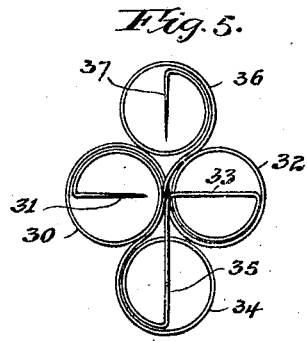
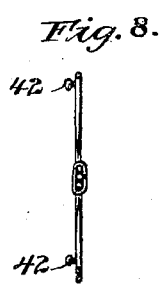
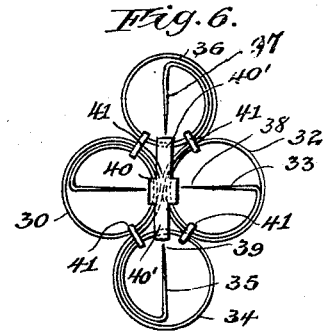
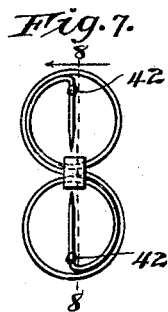
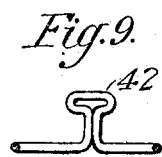
Witnesses,
Inventor,
William E. Henderson
By Offield, Towle & Linthicum
Attys.

UNITED STATES PATENT OFFICE.

WILLIAM E. HENDERSON, OF CHICAGO, ILLINOIS.

PIN.

No. 828,286.  Specification of Letters Patent.  Patented Aug. 7, 1906.

Application filed August 16, 1905. Serial No. 274,414.

*To all whom it may concern:*

Be it known that I, WILLIAM E. HENDERSON, a citizen of the United States, residing at Chicago, in the county of Cook and State of Illinois, have invented certain new and useful Improvements in Pins, of which the following is a specification.

My invention relates to pins, and comprises an article of that kind which is especially valuable and useful in attaching and holding scarfs, socks, sleeves, belts, badges, and the like and in decorating and festooning.

The preferred form of my invention is made by bending a piece of wire into two adjacent reversely-wound rings each comprising one and a half coils of wire, each sharpened end of the wire being bent inwardly diametrically across its ring in the plane thereof and terminating near the opposite side of the ring. In order to strengthen the structure, although its use is not absolutely necessary, I secure the proximate parts of the two rings together adjacent to the pin-points by a metallic clip or drop of solder. Pins of this general type having more than two pin-points may be made after this fashion, but some cutting of the wire is usually necessary.

In the accompanying drawings I have illustrated several embodiments of my invention to show the essential features thereof.

In said drawings, Figure 1 is a face view of a double pin embodying my invention. Fig. 2 is a longitudinal section on the line 2 2 of Fig. 1. Fig. 3 illustrates the manner in which a wire is coiled in order to produce a pin having three engaging pointed portions. Fig. 4 illustrates such a pin in completed form. Fig. 5 illustrates the manner of coiling a strip of wire to form a pin having four sharpened engaging portions. Fig. 6 illustrates such a pin in completed form. Fig. 7 is a face view of a modified form of pin similar to the one illustrated in Figs. 1 and 2. Fig. 8 is a cross-section on line 8 8 of Fig. 7. Fig. 9 is an enlarged detailed view of the knob on one of the sharpened portions.

The pin shown in Fig. 1 is made of a single piece of wire coiled into two adjacent reversely-wound rings 10 and 11, the ends of the wire being pointed and bent inwardly to extend diametrically across and in the plane of the rings, the two coils 10 and 11 each comprising one and a half turns of wire, as shown. These inwardly-extended parts form garment-engaging portions 12 and 13, whose ends are sharpened or pointed at 14 and 15. The two rings thus formed are bound more securely together by means of metallic clip 16, bent over the wires at the proximate parts of the rings and retaining the same in place, as shown in Figs. 1 and 2. In place of such clip, however, I may use a drop of solder to hold the portions of the wire together, since it is found that the latter means works satisfactorily.

Referring to Fig. 3, it will be seen that in order to economically and quickly construct a pin with three pointed garment-engaging portions the wire has to be coiled in a peculiar manner, as follows: One end of the wire 23, which is sharpened at its inner end, is bent at its outer end and coiled around one and a half times in the same plane to form ring 20. The wire then passes over and is similarly but reversely wound around one and a half times to form the ring 21, the inner end of the wire then being bent to form the transverse portion 24, which passes below the center of ring 21 for a purpose to be hereinafter set forth. The wire crosses over to make the intermediate portions 26 and is coiled around one and a half times to form ring 22, its inner end being sharpened and bent downwardly to provide the pointed engaging portion 25. In order to bind the parts together, and thus make a firmer and more secure structure, I fasten the four adjacent portions of wire comprising parts of coils 20 and 21 by means of a metallic clip 27, the same being bent around them to clamp them together. Clip 27 has an integral extension 27', which is clamped around that portion of ring 22 opposite the point of part 25. I also solder the coils forming rings 20, 21, and 22 at the points 29 and 29ª to bind them together; but it is of course evident that instead of the drops of solder I may use clips similar to that shown on Figs. 1 and 2. The portion of wire 26 is subsequently cut at the point 28, and part 24 is bent so as to pass through the center of coil 21, terminating adjacent to clip 27, the inner end of part 24 being sharpened to form a pointed fabric-engaging member, as is illustrated in Fig. 4. The pin is then in completed form and ready for use.

A pin with four points or sharpened engaging portions is constructed similarly, the method of manufacturing it being shown in Fig. 5. Leaving the sharpened end portion 31 straight, the wire is wound around one and a half times in the same plane to form coil 30 and is then coiled in a reverse direction one and a half times, so as to form ring 32, the inner end being subsequently bent inwardly to make the portion 33 and then outwardly or downwardly, as shown in Fig. 5, to form the portion 35. Then the wire is coiled one and a half times to form ring 34 and is afterward passed upwardly, being reversely coiled at its upper end to form ring 36, the inner end being turned downwardly and inwardly to make the sharpened engaging portion 37. The wire after being cut at the points 38 and 29 to remove the small right-angled portion thereof, as illustrated in dotted lines in Fig. 6, is sharpened at the inner ends of parts 33 and 35. All the wires at the center portion of the pin are clamped together by clip 40, its lateral extension 40' being bent around rings 34 and 36 adjacent to the ends of the pointed parts 35 and 37. Four metallic clips or drops of solder 41 may be used, if desired, to secure the rings together more securely, as shown in Fig. 6.

The method of operating the pin illustrated in Fig. 1 will now be described, and it will be evident from this description how the pins illustrated in Figs. 4 and 6 are manipulated. Suppose, for example, that the pin shown in Fig. 1 is to be used to hold up a sleeve. The operator by means of his thumb presses the sharpened portion 13 out of the plane of ring 11 and passes the same through a portion of the sleeve, which is then gathered up sufficiently, and the sharpened portion 12 of the pin is pressed out of the plane of its ring 10 and also caught in the sleeve, thus holding up the latter as desired. When the pointed members 12 and 13 are released from the thumb's pressure, they spring back again into the plane of their coils, and for this reason there is no danger of their catching in any other article. The pull exerted by the garment, owing to its gathered-up condition, is at the outer ends of the members 12 and 13, so that there is no tendency of the pin to become disengaged from the fabric to which it is attached. Furthermore, since the clip 16 and the corresponding parts in the other forms of pins are considerably thicker than the portions 12 and 13 they, in conjunction with the rings, form neat housings for the sharp points, and since the latter are spaced but a short distance from the clips there is practically no tendency or chance for the garment slipping off the pin unless the portion 12 or 13 is intentionally pulled out of the plane of its ring or coil. The sharpened portions 12 and 13 have considerable flexibility in view of their comparatively short length, the portions themselves having considerable resiliency in addition to that of the half-coils connecting their outer ends to the clip 16. In order to remove the pin from the sleeve or other garment or fabric, it is not necessary to manually press the sharpened portions out of the plane of their rings; but by merely pulling the whole pin in one direction and then in the opposite direction the portions of the sleeve which have been engaged by the pin readily slip off, the pull on the pin itself bending the sharpened portions thereof somewhat out of their normal plane.

It will be noted that when the pin is not in use it can be readily handled, carried in the pocket, or passed over the garment without the operator being pricked by the pin-points or without the latter catching in the garment, since the points are neatly housed within their surrounding rings and because the clips opposite the pin-points are considerably thicker than the wire.

When it is desired to hold the two parts together and also at the same time fasten these two parts to another, I use a pin of the type illustrated in Fig. 4, the same having three sharpened pin-points.

For festooning, decorating, and the like it may be convenient to use a pin of the shape shown in Fig. 6, which has four sharpened points. The manipulation of these pins, however, will be evident from the above description.

The modified form of pin shown in Figs. 7 and 8 is in all respects like that illustrated in Figs. 1 and 2 except that it has the small knobs 42 at the outer ends of the straight spring portions of the pin and integral therewith, the knobs or push-buttons being formed by bending the wire somewhat out of its plane and then back again, the end of the protruding portion being flattened. The purpose of these knobs is to facilitate the deflecting of the sharpened pin-points out of the plane of their surrounding coils, so that the pin can be more readily attached to a garment.

It is obvious that I have produced a pin which is economical in the cost of manufacture, which is easy to manipulate, which comprises but a small number of parts, and which holds the garment or other article securely. Besides the above-mentioned features my novel form of pin has the additional advantages of having pointed engaging portions of great flexibility yet occupying a comparatively small space, and there is no danger of the pin catching in anything when not actually in use, since the pin-point is housed within and in the plane of the surrounding ring portion. A further desirable feature of such a pin is the ease with which it may be attached to or released from the garment or other article.

While I have shown and described what I deem to be preferred embodiments of the several features of my invention, yet the details of the construction may be modified without departing from the invention, and I do not, therefore, limit myself to such details except to the extent that they are made the subject-matter of specific claims.

I claim—

1. A pin made of a single piece of wire bent to form a plurality of rings and a sharpened portion for each ring extending across the same and terminating adjacent to one side thereof, the parts of said wire forming the rings and sharpened portions lying in the same plane, substantially as described.

2. A pin made of a single piece of wire bent to form a plurality of rings and a sharpened portion for each ring extending across the same, and means to bind said rings together, each of said sharpened portions terminating adjacent to said binding means, the parts of said wire forming the rings and sharpened portions lying in the same plane, substantially as described.

3. A pin made of a single piece of wire bent to form two reversely-coiled rings and a sharpened portion for each ring extending across the same and terminating adjacent to one side thereof, the parts of said wire forming the rings and sharpened portions lying in the same plane, substantially as described.

4. A pin made of a single piece of wire bent to form reversely-coiled rings and a sharpened portion for each ring extending across the same, and means to bind said rings together, said sharpened portions terminating adjacent to said binding means, the parts of said wire forming the rings and sharpened portions lying in the same plane, substantially as described.

5. A pin made of a single piece of wire bent to form a plurality of rings and a sharpened portion for each ring extending across the same, and terminating adjacent to one side thereof, each sharpened portion being provided with a knob, the parts of said wire forming the rings and sharpened portions lying in the same plane, substantially as described.

6. A pin made of a piece of wire, said wire being bent to form a plurality of rings each consisting of one and a half coils, an integral pointed engaging portion in the plane of and extending diametrically across each ring, and a knob for each of said portions, substantially as described.

WILLIAM E. HENDERSON.

Witnesses:
WALTER M. FULLER,
FREDERICK C. GOODWIN.